United States Patent
Michielsen et al.

(10) Patent No.: US 12,192,876 B2
(45) Date of Patent: Jan. 7, 2025

(54) ROUTE DISCOVERY IN NETWORKS WITH COMBO NODES

(71) Applicant: SIGNIFY HOLDING B.V., Eindhoven (NL)

(72) Inventors: Robin Michielsen, Eindhoven (NL); Bas Driesen, Weert (NL); Gerhardus Engbertus Mekenkamp, Valkenswaard (NL); Bozena Erdmann, Aachen (DE)

(73) Assignee: SIGNIFY HOLDING B.V., Eindhoven (NL)

( * ) Notice: Subject to any disclaimer, the term of this patent is extended or adjusted under 35 U.S.C. 154(b) by 390 days.

(21) Appl. No.: 17/785,483

(22) PCT Filed: Dec. 7, 2020

(86) PCT No.: PCT/EP2020/084832
§ 371 (c)(1),
(2) Date: Jun. 15, 2022

(87) PCT Pub. No.: WO2021/122089
PCT Pub. Date: Jun. 24, 2021

(65) Prior Publication Data
US 2023/0013924 A1    Jan. 19, 2023

(30) Foreign Application Priority Data
Dec. 17, 2019 (EP) ..................... 19216934

(51) Int. Cl.
*H04W 40/24* (2009.01)
*H04W 84/18* (2009.01)

(52) U.S. Cl.
CPC ............ *H04W 40/24* (2013.01); *H04W 84/18* (2013.01)

(58) Field of Classification Search
CPC ....... H04W 40/24; H04W 84/18; H04W 4/80; H04L 47/32; H04L 67/565; H04L 69/08
See application file for complete search history.

(56) References Cited

U.S. PATENT DOCUMENTS

2010/0257598 A1* 10/2010 Demopoulos ....... H04L 63/1441
726/13
2011/0069665 A1* 3/2011 Erdmann ............ H04W 40/246
370/328

(Continued)

FOREIGN PATENT DOCUMENTS

EP       3154237 A1    4/2017
WO    2018228883 A1   12/2018

OTHER PUBLICATIONS

P. Yadav, et al.: "YA-MAC: Handling Unified Unicase and Broadcast Traffic in Multi-hop Wireless Sensor Networks", Distributed Computing in Sensor Systems and Workshops (DCOSS), 2011 International Conference on, IEEE, Jun. 27, 2011, pp. 1-9.

(Continued)

*Primary Examiner* — John D Blanton (57) ABSTRACT

The invention relates to the field of wireless mesh communication networks and in particular to methods, networks and nodes (101) for use in such a wireless mesh network (100) for establishing routes in the wireless mesh network (100) by pro-actively regularly sending many-to-one route requests at randomized intervals by wireless network nodes (101) that can operate as a proxy nodes for a mobile wireless device (104) communicating using a first wireless communication protocol and further nodes (102, 103) in the wireless mesh network (100) communicating using a second wireless communication protocol.

15 Claims, 5 Drawing Sheets

(56) References Cited

U.S. PATENT DOCUMENTS

| | | | |
|---|---|---|---|
| 2014/0269772 A1* | 9/2014 | VanderZee | H04W 4/80 |
| | | | 370/474 |
| 2016/0192176 A1 | 6/2016 | Zhu et al. | |
| 2017/0013924 A1* | 1/2017 | Johnson | A45C 11/00 |
| 2017/0093716 A1* | 3/2017 | Ko | H04L 45/745 |
| 2023/0014075 A1* | 1/2023 | Michielsen | H04W 40/24 |
| 2023/0188466 A1* | 6/2023 | Ko | H04L 45/745 |
| | | | 370/392 |

OTHER PUBLICATIONS

Texas Instruments: "Z-Stack Developer's Guide", Jan. 1, 2011, Retrieved on Oct. 28, 2013, pp. 1-34.

* cited by examiner

ROUTE DISCOVERY IN NETWORKS WITH COMBO NODES

CROSS-REFERENCE TO PRIOR APPLICATIONS

This application is the U.S. National Phase application under 35 U.S.C. § 371 of International Application No. PCT/EP2020/084832, filed on Dec. 7, 2020, which claims the benefit of European Patent Application No. 19216934.0, filed on Dec. 17, 2019. These applications are hereby incorporated by reference herein.

FIELD OF THE INVENTION

The invention relates to the field of wireless communication networks and in particular to wireless networks, wireless network nodes and methods for establishing routes in a wireless mesh network using many-to-one route requests.

BACKGROUND OF THE INVENTION

There is an ongoing trend in the professional lighting market to move more and more towards connected lighting systems, which enable all kinds of new features like (remote) scheduling, energy monitoring, sensor-based lighting control and asset management. In many cases these systems are installed in existing buildings, in which cases a wireless network is preferred to avoid having to deploy new cables (for lighting control) through the ceiling. Examples of such wireless network protocols which are used widely in current practice are open standards protocols like Zigbee, Thread, Bluetooth Low Energy (BLE), BLE mesh, Wi-Fi, Wi-Fi direct, and various proprietary network implementations built on top of the IEEE 802.15.4, IEEE 802.15.1 or IEEE 802.11 standards.

More recently we see a rise in the use of so-called combo chips in lighting networks. Combo-chips effectively are a cost-efficient manner to have a node in a lighting network communicate using different communication protocols. Alternatively, two chips could be used that are placed back-to-back so as to bridge two distinct wireless networks.

The present invention aims to address a problem that materializes in the context of a Zigbee/BLE node.

SUMMARY OF THE INVENTION

In a typical Zigbee network an application on the Smartphone connects to the Zigbee network through an internet connected gateway, e.g. using Wi-Fi connection. The gateway makes sure that routes to each of the Zigbee nodes in the network are pre-established. This will enable the application on the Smartphone to swiftly communicate with each of the nodes in the network, since the routes from the gateway to the other nodes in the network are already discovered—because the gateway stays connected to the network, even if the Smartphone disconnects. In case a route to a node is not established, and the Smartphone (or gateway) intends to communicate with that node in unicast, that route must first be discovered.

Route discovery takes time and increases the latency to the application—in addition it creates a broadcast burst, which can temporarily negatively impact the network performance. In a Zigbee network route discovery can take up to 1 to 2 seconds. Also, the route discovery tables of the nodes in the Zigbee network (i.e. the tables temporarily storing the results of the ongoing route discovery, to keep track of retransmissions of the route requests frame and the changing cost, over the period of 10 seconds) are a limited resource (the Zigbee r22 PICS only requires a minimum of 4 route discovery tables). For both reasons, sending multiple AODV routes at the same time should be avoided.

As a further point the inventors noted that in a standalone Zigbee network there is no fixed gateway. As a result, there is no fixed/single entry into the Zigbee network from which the Smartphone could reach all other nodes. Instead, the inventors envisage a standalone Zigbee network that comprises multiple Zigbee/BLE proxies, to which the phone can randomly connect—still with the intention to talk through the proxy it connects to, to other nodes on the Zigbee network.

Communicating through one selected proxy with multiple nodes on such a Zigbee network has multiple advantages: it allows the user to avoid the tedious identification of the individual nodes before establishing of a 1:1 BLE connection, it eliminates the aforementioned repetitive connection time (which can be in the range of 1 to 2 seconds per connection per node, depending on the discovery and security method used) and allows to further save time by parallelizing the operations on the network: rather than reading the node status one by one. To this end the Smartphone can request the status update from all nodes in broadcast, or from multiple nodes in unicast, and collect the responses as they are received.

However, a typical Zigbee standalone network system envisaged by the inventors comprises several BLE/Zigbee capable proxy nodes and optionally the network may also include one or more Zigbee-only network nodes. Establishing the routes to all other nodes in the network upon connection of the phone to the proxy would result in long route discovery times and consequently a poor user experience.

The present invention aims to reduce the overall network latency when sending messages from an arbitrary proxy node to the other Zigbee nodes in the network. This objective is realized by a wireless mesh network as claimed in claims 1 and 2, by a wireless network node as claimed in claims 9 and 10 and a method of route discovery in a wireless mesh network as claimed in claim 15.

In accordance with a first aspect a wireless mesh network comprising a first plurality of wireless network nodes is provided, wherein each wireless network node of the first plurality is arranged to operate as both a proxy and a concentrator and comprising a first transceiver to communicate using a first wireless communication protocol, and to communicate using a second wireless communication protocol for wireless mesh networking, wherein each of the first plurality of wireless network nodes is arranged to: communicate with a mobile wireless device using the first communication protocol; communicate with wireless nodes in the wireless network using the second wireless communication protocol and in preparation for communication using the second wireless communication protocol as a concentrator, send out many-to-one-route-requests in the wireless mesh network at randomized intervals, to prevent a broadcast storm when multiple wireless nodes in the wireless mesh network are powered up at the same time.

In accordance with a second aspect, a wireless mesh network comprising a first plurality of wireless network nodes is provided, wherein each wireless network node of the first plurality is arranged to operate as both a proxy and a concentrator and comprises: a first transceiver to communicate using a first wireless communication protocol, and a second transceiver to communicate using a second wireless communication protocol for wireless mesh networking, wherein each of the first plurality of wireless network nodes is arranged to: communicate with a mobile wireless device using the first communication protocol; communicate with wireless nodes in the wireless network using the second wireless communication protocol and in preparation for communication using the second wireless communication protocol as a concentrator, send out many-to-one-route-requests over the wireless mesh network at randomized intervals, to prevent a broadcast storm when multiple wireless nodes in the wireless mesh network are powered up at the same time.

Preferably the first plurality of network nodes, of the first and second aspect, continuously keeps track of routes in the network in preparation for communication using the second wireless communication protocol.

The advantage of a wireless network according to the first and/or second aspect is that the wireless network nodes are arranged to perform route discovery in a manner that prepares for communication using mobile devices that can connect "ad hoc" to the wireless network. This is done by using wireless nodes capable of communicating using both the first and the second communication protocol, so-called combo wireless nodes or combo nodes for short. In this manner it may be possible to provide select combo nodes that "open-up" the wireless mesh network for (e.g. control) communications. So even when only a limited number of combo nodes are provided in a room, those combo nodes may enable access to the wireless mesh network. In case the first communication protocol is the BLE protocol, discovery may be through BLE advertising, which allows the mobile device after connection to control the combo nodes as week as non-combo nodes in the room as the routes have already been discovered.

The inventors note that in practical networks, where the second communication protocol is the Zigbee protocol, it may take as much as a 1 second for a message to ripple through the mesh. In line therewith many-to-one route requests in the network should be spaced apart in time sufficiently, so that the network topology is updated in line with the requirements of the application, but the network load resulting from the MTORRs is kept at bay. As a rule-of thumb in an office application it may be preferable to limit the amount of MTORRs in the network to a level such that no more than on average one MTORR occurs in the network every 5 seconds. Notably, this still causes quite some MTORR overhead, and the average MTORR occurrence may be lowered to one every 10 seconds already lowers the overhead. The option to have on average one MTORR every 15 seconds appears to be a preferred parameter for office lighting networks.

It will be clear to those skilled in the art, that different applications may require different parameters. If the number of changes in topology is high, it may be desirable to increase the number to on average on every 10 seconds, at the cost of a larger MTORR overhead. Conversely if the number of topology changes is lower, then a larger average time between MTORRs may be acceptable and randomized interval might be on average one MTORR every 30 seconds, or one every minute.

In an exemplary implementation of the above first and second aspect each of the first plurality of wireless network nodes are BLE/Zigbee proxy nodes in a Zigbee mesh network, where the proxies will act as concentrators and regularly send out a many-to-one-route requests, MTORRs, at randomized intervals. Randomization may be implemented, for example using a random backoff period, which backoff can be set to be within a predetermined value (the maximum backoff period).

Preferably the randomized interval (e.g. the predetermined value) is selected based on the size of the network/number of proxies in the network. As MTORRs generate load in the network, issuing MTORRs in close succession causes substantial message overhead. If an MTORR usually takes less than a second to complete, having a message every 10 seconds causes substantial network load. Hence having on average 15 seconds between MTORRs in the network is preferable, but as a rule of thumb having one MTORR on average in the network every 10-30 seconds should be workable. Having a longer time on average between successive MTORRs will work but will result in a longer time before all routes are setup/updated.

For example, in a network having 250 router nodes, having on average one MTORR every 15 second means that all routes could then be mapped in approximately 250×15 seconds.

When a node receives an MTORR it stores an entry into its routing table indicating that the other node issuing the MTORR is a concentrator node. When all proxy nodes have sent a MTORR each node has a complete routing table with known routes to any other proxy node in the network.

When a Smartphone, once the routing tables are filled, connects to an arbitrary proxy node, it can reach any of the Zigbee nodes using the info that is already present in the proxy node's routing table.

In addition it is noted that Zigbee routers in a Zigbee wireless mesh that act as routers, may also act as concentrators and send out a many-to-one route-requests, in a similar manner as described hereinabove for the proxies. As will be apparent to those of ordinary skill, this can be combined with both aspects mentioned above.

The randomized intervals of the wireless mesh network of the first and/or second aspect are preferably based on a predetermined value based on the size of the network or more preferably on the number of proxies in the wireless mesh network and are randomized. The underlying idea being that a network with a larger number of nodes or a larger number of proxies/concentrators will result in more MTORR message overhead. Thus, spreading out these messages, by lowering the frequency will reduce the impact. Moreover, randomizing will help reduce the likelihood of peak congestion.

Preferably the wireless mesh network consists of the first plurality of wireless network nodes and a second plurality of wireless network nodes, and each wireless network node of the second plurality comprises a second transceiver to: communicate using the second wireless communication protocol, and each of the second plurality of network nodes is arranged to: communicate with nodes in the wireless mesh network using the second wireless communication protocol and wherein the number of wireless router nodes in the first plurality is larger than 30% of the total number of wireless router nodes in the wireless mesh network. Optionally the number of wireless router nodes in the first plurality is larger than 40% or even larger than 50% of the total number of wireless router nodes in the wireless mesh network.

When a larger number of wireless nodes are combo/dual-protocol nodes, the impact of the route discovery on network traffic may increase, as a result, the benefit of spreading out the MTORR messages over time also increases. In fact, the inventors foresee that if one might want to implement a network primarily using combo/dual-protocol nodes, this would be a network that would particularly benefit from the invention.

When a substantial number of wireless nodes would be combo/dual-protocol nodes, in particular in dense networks, it might be advantageous to consider to switch some of the combo/dual-protocol nodes to second mesh protocol operation only, or to even to a non-router role. The advantage of doing so, is that in dense networks switching nodes to a non-router role, e.g. a Zigbee End Device or ZED role is possible without substantially impacting the network/routing reliability. As a result, the number of nodes for which path discovery would be required can be reduced thereby further contributing to a reduction in MTORR message load in the network.

Switching wireless network nodes to the ZED role (second mesh protocol operation only) may be done prior to installation, e.g. based on an installation plan and implemented by means of either software configurations, e.g. using NFC, or by means of hardware configuration, e.g. using dipswitches. Alternatively, such switching could be done during commissioning, based on the installation plan and/or radio measurements in situ, and implemented using hardware configuration, or using software configuration using a commission tool. Finally, such switching could be done during the operational phase, at which point the software-based configuration using the second wireless communication protocol would be preferred.

As wireless networks can have different characteristics that may affect routing in the network, the randomized intervals may need to be tweaked accordingly. For example, if the only variations in network routing/topology are device defects or occasional RF interference by non-network sources, the randomized intervals could be set to values whereby mapping the routers takes on average more than an hours or hours. If alternatively, a network contains wireless nodes that may go in power saving mode on a regular basis, or where a low latency is required, randomized intervals may be selected such that mapping the routes within the network is completed within the range of 15 minutes to one hour. In these scenarios a time-characteristic, or time-attribute of the network topology/routing, is used to configure the randomized intervals.

Advantageously a wireless mesh network according to the first or second aspect is a network without a fixed gateway (such as a Zigbee network without a fixed gateway).

In accordance with a third aspect a wireless network node for use in a wireless mesh network is provided, the wireless network node arranged to operate as both a proxy and a concentrator in the wireless mesh network, the wireless network node comprising a first transceiver to communicate using a first wireless communication protocol, and to communicate using a second wireless communication protocol for wireless mesh networking, and wherein the wireless network node is arranged to: communicate with a mobile wireless device using the first communication protocol; communicate with wireless nodes in the wireless network using the second wireless communication protocol and in preparation for communication using the second wireless communication protocol as a concentrator, send out many-to-one-route-requests in the wireless mesh network at randomized intervals, to prevent a broadcast storm when multiple wireless network nodes are powered up at the same time.

In accordance with a fourth aspect a wireless network node for use in a wireless mesh network is provided, the wireless network node arranged to operate as both a proxy and a concentrator in the wireless mesh network, the wireless network node comprising: a first transceiver to communicate using a first wireless communication protocol, and a second transceiver to communicate using a second wireless communication protocol for wireless mesh networking, and wherein the wireless network node is arranged to: communicate with a mobile wireless device using the first communication protocol; communicate with wireless nodes in the wireless network using the second wireless communication protocol and in preparation for communication using the second wireless communication protocol as a concentrator, send out many-to-one-route-requests, MTORRs, in the wireless mesh network at randomized intervals, to prevent a broadcast storm when multiple wireless network nodes are powered up at the same time.

Preferably the wireless network node in accordance with the third and fourth aspect, continuously keeps track of routes in the network in preparation for communication using the second wireless communication protocol.

The randomized intervals may be selected in line with those discussed hereinabove for the first and second aspect.

The wireless network node according to the third/fourth aspect is arranged to communicate with a mobile wireless device using the first communication protocol. The wireless network node may further be arranged to in preparation for such communication as a concentrator regularly send out an MTORR at randomized intervals using the second wireless communication protocol, for example using a random back-off period which can be set to be within a predetermined value, which predetermined value preferably is selected based on the size of the network/number of proxies in the network.

Preferably the network node is a lighting network node, being one of a presence sensor, a light sensor, a lighting switch, a retrofit lamp, a luminaire, and/or a wireless network controller.

Preferably the first wireless protocol is the BLE protocol.

Preferably the second wireless protocol is the Zigbee protocol.

In accordance with a fifth aspect a method of route discovery in a wireless mesh network is provided comprising a first plurality of wireless network nodes, each wireless network node of the first plurality arranged to operate as both a proxy and a concentrator and comprising: a first transceiver to communicate using a first wireless communication protocol, and to communicate using a second wireless communication protocol for wireless mesh networking, or alternatively, a first transceiver to communicate using a first wireless communication protocol, and a second transceiver to communicate using a second wireless communication protocol for wireless mesh networking, the method comprising each wireless network node of the first plurality: in preparation for communicating using the second wireless communication protocol as a concentrator the respective wireless mesh node regularly sending out many-to-one-route-requests in the wireless mesh network at randomized intervals, to prevent a broadcast storm.

Also disclosed is a computer program comprising code means which, when the program is executed by a wireless combo node comprising processing means, cause the processing means to carry out any one of the methods of the present invention.

BRIEF DESCRIPTION OF THE DRAWINGS

In the drawings, like reference characters generally refer to the same parts throughout the different figures. Also, the drawings are not necessarily to scale, emphasis instead generally being placed upon illustrating the principles of the invention.

DETAILED DESCRIPTION OF EMBODIMENTS

Throughout this patent application examples are used utilizing a Zigbee network and indeed the present invention is particularly beneficial for Zigbee networks, however the inventive concept is not limited to Zigbee and may be used in conjunction with other networks such as Thread, BT Mesh, Wi-Fi Mesh, JupiterMesh or other mesh topologies.

When considering wireless networks, the concept of "standalone connected" wireless networks is a proposition that works without a gateway. The setup and configuration of such a Zigbee network and the devices therein may happen through an application on a mobile device 104, such as the Smartphone shown in FIG. 1, using a BLE connection from the Smartphone to a Zigbee/BLE combo node 101, here a retrofit lamp. The Zigbee/BLE combo node 101 with which the Smartphone connects via BLE is used as a proxy into the Zigbee network: by connecting to a single Zigbee/BLE combo node over BLE, the Smartphone can connect to and control any of the nodes in the Zigbee mesh network.

Figure 1:
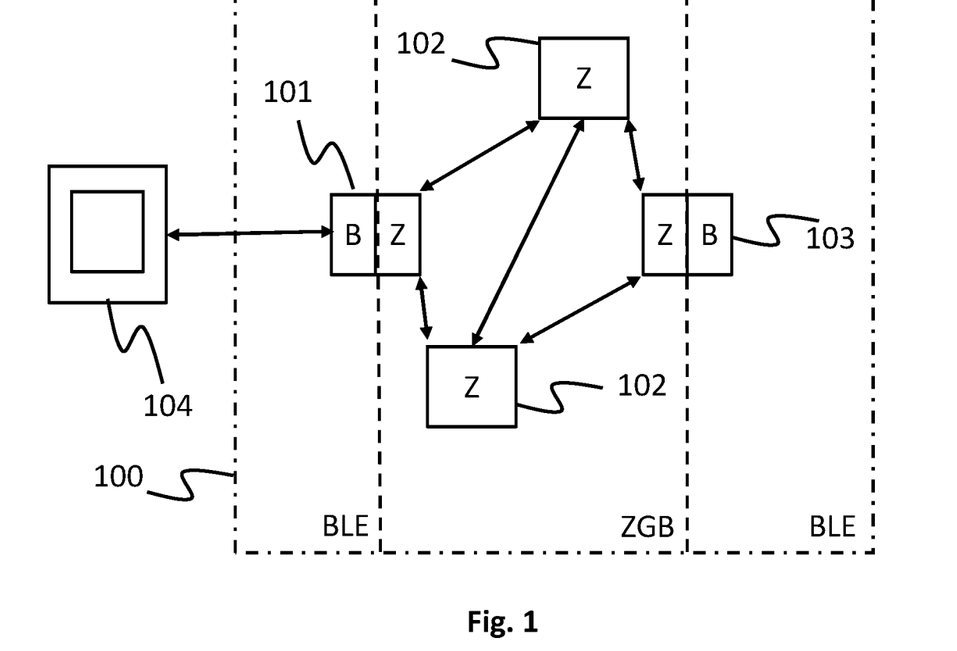
FIG. 1 depicts an overview of the system wherein a mobile device interacts with a wireless network through a combo node.

In this manner a mobile device 104 can be used to directly communicate with a wireless mesh node 101, 103 that supports both the Zigbee/BLE protocols. However, for communicating with network nodes beyond the proxy, route discovery is needed.

Figure 6A:
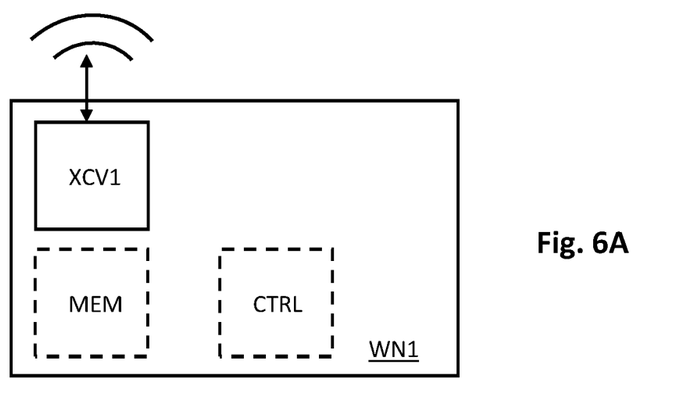
FIGS. 6A and 6B show a schematic block diagram of a wireless network node.

In embodiments the combo node is a Zigbee/BLE combo device, which may use a combo chip wherein the chip is arranged to operate in accordance with one out of the two protocols at a time, in such devices, part of the processing resources could be re-used and a more cost efficient solution is possible. An example wireless network node WN1 is depicted in FIG. 6A, the exemplary wireless network node WN1 comprises a first transceiver XCV1 to communicate using a first wireless communication protocol, and to communicate using a second wireless communication protocol for wireless mesh networking, this will work best when the first and second wireless communication protocol operate in a similar frequency band as then part of the antenna infrastructure can be reused. In this way the wireless network node WN1 may be arranged to: communicate with a mobile wireless device 104 using the first communication protocol, for example BLE, and to communicate with wireless nodes 102, 103 in the wireless network 100 shown in FIG. 1 using the second wireless communication protocol, for example Zigbee. The wireless network node WN1 may optionally comprise a memory MEM for storing its routing table(s) and/or a controller CTRL. It will be understood by those skilled in the art, that such MEM and CTRL may be separate physical entities within the wireless network node WN1, or could represent logical entities, e.g. in case the functionality is implemented in an Application Specific Integrated Circuit or ASIC.

Figure 6B:
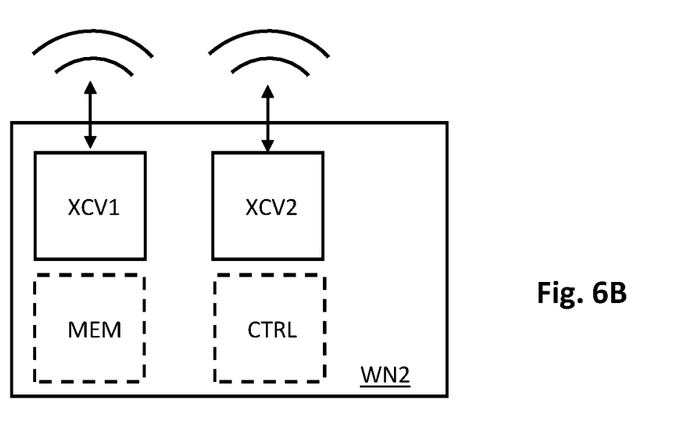

Alternatively, the Zigbee/BLE combo chip may be outfitted with one or more chips or transceivers that enable the device to operate in both networks in parallel. A corresponding example wireless network WN2 is depicted in FIG. 6B. The wireless network node WN2 comprises a first transceiver XCV1 to communicate using a first wireless communication protocol, and a second transceiver XCV2 to communicate using a second wireless communication protocol for wireless mesh networking. The wireless network node may in this manner be arranged to communicate with a mobile wireless device using the first communication protocol and communicate with wireless nodes (102, 103) in the wireless network using the second wireless communication protocol. This would allow parallel operation of both radios and may be relevant when the protocols use different part of the RF spectrum.

The wireless network node WN2 may also optionally comprise a memory MEM for storing its routing table(s) and/or a controller CTRL. It will be understood by those skilled in the art, that such MEM and CTRL may be separate physical entities within the wireless network node WN2, or could represent logical entities, e.g. in case the functionality is implemented in a single physical entity such as by means of an Application Specific Integrated Circuit or ASIC.

Zigbee supports the concept of "many-to-one route requests" (MTORR) where a concentrator (typically the gateway) periodically broadcasts an MTORR. When a node receives this MTORR it stores an entry into its routing table indicating that the originator node is a concentrator node and from which other node it received the least-cost MTORR frame, this establishes the route from that node to the concentrator—and as the MTORR gets rebroadcast by every router node on the network, from every router node to the concentrator.

The reverse route from the concentrator to the Zigbee node still needs to be established. There are multiple ways this can be done. Zigbee has two other routing methods, source routing and AODV routing. Typically, MTORR are used in combination with source routing, but it can also be used with AODV routing. Typically, there is only one concentrator node in a Zigbee network being the gateway/bridge. Similar situations apply to other mesh network protocols.

In a regular Zigbee network each Zigbee router node will send approximately a link message every 15 seconds. With this link status message the neighbouring nodes will be able to update their neighbour tables with the correct link cost for their neighbours, as measured by those neighbours (outgoing link cost). The link status message is a single hop broadcast message.

Consider a standalone Zigbee network where there is no fixed gateway. As a result, there is no fixed/single entry into the Zigbee network from which the Smartphone could reach all other nodes. Consider a standalone Zigbee network that consist of multiple Zigbee/BLE proxies, to which the phone can randomly connect—still with the intention to talk through the proxy it connects to, to other nodes on the network.

Communicating through the one selected proxy with multiple nodes on the Zigbee network has multiple advantages: allows the user to avoid the tedious identification of the individual nodes before establishing the 1:1 BLE connection, eliminates the repetitive connection time (which can be in the range of 1 to 2 seconds per connection per node, depending on the discovery and security method used) and allows to further save time thanks to parallelizing the operations on the network: rather than reading the node status one by one, the Smartphone can request the status update from all nodes in broadcast, or from multiple nodes in unicast, and collect the responses as they are received.

The above Zigbee standalone network system may consist of all BLE/Zigbee capable proxy nodes. Establishing the routes to all other nodes in the network only upon connection of the phone to the proxy would result in long route discovery times and consequently a poor user experience. The invention significantly reduces the overall network latency when sending messages from an arbitrary proxy node to one or more other Zigbee nodes in the network.

Although particularly advantageous in a standalone Zigbee network, the same principle may also be applied in other mesh networks that have multiple concentrators. In networks with a large number of concentrator/proxy nodes it is relevant to keep track of available routes in the network. When this is done it will be possible for mobile devices to connect ad hoc to the network and to be able to communicate, not only with the proxy, but also other nodes in the mesh network without having to wait for route discovery to complete.

The proposed approach may also be used in wireless mesh networks where, apart from the earlier described Zigbee/BLE nodes, there are other nodes that only support the second protocol. Such nodes may be "legacy" Zigbee-only nodes or may be Zigbee/BLE capable nodes may that have been configured (either prior to installation, during commissioning or during operation) to operate as Zigbee only nodes. For example in networks with many Zigbee/BLE nodes that are in close proximity, it may be advisable to configure some of the Zigbee/BLE router nodes as Zigbee End Devices, ZED, so as to simplify the network topology and reduce the need for route discovery.

In hybrid networks with Zigbee-only nodes and the Zigbee/BLE nodes, the combo devices may be used as concentrators and/or proxies. The Zigbee/BLE capable devices will then pro-actively already perform route discovery, similar to the above example where the network only included Zigbee/BLE capable nodes. The underlying idea being that the Zigbee/BLE capable devices also in hybrid configurations can provide access to the Zigbee network for mobile nodes.

Preferably the behaviour of proxy nodes and router nodes described represents the preferred default behaviour.

In another embodiment, it could be triggered when a node operates in a network where the number or the density of router/proxy nodes exceeds a particular threshold or when a node joins a particular type of network, e.g. with distributed security or centralized security mode, of a particular ecosystem or when a client/server of a particular cluster is present in the network.

Further, it could be triggered automatically when a proxy/router on a network with a gateway node loses connectivity to that gateway node—or if the procedure for replacing that gateway node got triggered (e.g. via the Zigbee trust centre swap out method).

Alternatively, it can be triggered in a particular action or configuration mode.

Further, in the method related to the proxy nodes, the behaviour described below could be triggered if the proxy got commissioned via the BLE interface, if the BLE interface of the proxy node remains/becomes open for BLE connection from Smartphones, etc. It could be activated via a configuration parameter/command.

Analogously, the behaviour described below could be deactivated upon detection of absence or change of any of the triggers described above.

After power up a Zigbee node broadcasts a MTORR. It sends out the MTORR with a random delay to prevent a broadcast storm when multiple nodes are powered up at the same time, which is typical in a lighting system.

A network address conflict leads to removal of routing tables for the conflicting address. Thus, when recovering from an address conflict, a node with a new address should proactively also send an MTORR, to re-establish the routes to itself. Similarly, any change in network parameters, i.e. channel, PANID or network key change, may result in nodes missing an update and temporarily losing connectivity, thus leading to changes in the network topology. Also there, the nodes rejoining with a new set of parameters may need to re-send MTORR, to re-establish the routes using the new links. It may be of benefit to do that after some defined delay from the parameter update command, to give some time to the other nodes to find to the new network, and not be forced to repeat the MTORR multiple times.

As nodes that participate in a route may disappear (be powered down) or the propagation conditions may change, rendering selected links along the route less reliable (e.g. due to moving metal pieces, e.g. metal doors), it is essential that every node sends out the MTORR not only after power up, but that it repeats this periodically. This method is similar to Zigbee router nodes periodically sending link status messages, apart from the fact that link status messages are single hop broadcasts and MTORRs are multi hop broadcast messages. Because of this difference it is important that MTORRs are sent out at a lower frequency than the link status messages in order not to congest the network. Link status messages are used to fill the neighbour table of the nodes within reach. The MTORR message are used to fill the routing table of the router nodes in the network.

At power up a Zigbee node broadcasts a device announcement to announce its presence on the network. This device announcement can be used by the other nodes as a trigger to send the next MTORR to (as soon as possible) fill the empty routing table of the newly announced node.

The nodes can be smart about sending their MTORR upon a new node joining: the nodes in the direct range of the new joiner node do not need to send their MTORR upon that node joining, since they will be able to establish communication based on the single-hop Link Status broadcasts. Furthermore, the nodes can analyse the device type flag in the capability field of the received Device_annce: if the joining device is a Reduced Function Device (RFD), no route needs to be established, because the parent of the joiner RFD will route on its behalf—and that route should already be in place. Similarly, Device_annce commands sent on behalf of Green Power Devices (GPDs) added to the network shall not trigger any additional MTORRs; the Device_annces on behalf of a GPD are identified by the IEEE address set to 0xffffffffffffffff.

By regularly sending MTORRs spaced apart by randomized intervals, broadcast storms can be reduced. Here randomized is understood to represent variations that can be based on physically random phenomena, but also comprises more common pseudo-random variations, such as those implemented using an LF SR or other pseudo-random generators. The underlying idea behind the randomized intervals, is that MTORRs will be spread out with an average delay above a certain predetermined value. In this manner the randomized intervals can be selected in such a way that, the network load of the MTORRs of proxies are distributed over time. Thereby reducing the likelihood of broadcast storms.

Figure 8:
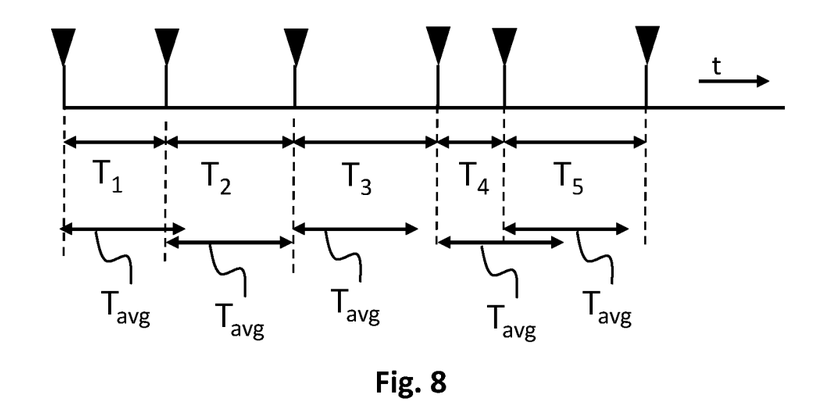
FIG. 8 shows a graph showing transmission of multiple MTORRs over time.

FIG. 8 shows a graph illustrating the transmission of multiple MTORRs, each marked as a triangle, from a single concentrator/proxy node over time. As can be seen the concentrator/proxy node regularly transmits MTORRs, but the MTORRs are not space apart at fixed distances. The MTORRs are spaced apart by respective periods $T_1$, $T_2$, $T_3$, etc. On average the MTORRs are spaced apart by $T_{avg}$, by controlling $T_{avg}$ the likelihood that multiple concentrator/proxies are issuing MTORRs at the same time is reduced.

It will be clear to those skilled in the art that this is particularly relevant in wireless networks where the number of concentrator/proxy nodes is large. In such a network the route discovery network load would become substantial if not properly managed. The claimed invention proposes a manner to pro-actively discover routes, such that concentrator/proxy nodes can offer fast network access to mobile nodes in the network. To avoid that many nodes broadcast their MTORR at the same time, the frequency with which the MTORR is sent can be adapted to the size of the network, or more preferably the number of proxies and/or routers on that network (go to lower frequency for large network to avoid congestion).

In a simple, non-limiting, example it may be possible for concentrator/proxy nodes to determine the $T_n$ duration (subsequent randomized interval durations) as:

$$T_n = \text{scale}((\text{number of (network nodes or proxy nodes})) \cdot \text{RAND}(\text{seed}) + \text{offset})$$

Here RAND (seed) is a seeded pseudo-random function using seed as its seed that returns a pseudo-random value in the range [0,1] and which has preferably a uniform probability density function. The scale factor allows tweaking of the average interval duration so as to create a sufficient spread of the MTORRs for all concentrators. Optionally an offset may be added so as to warrant a minimum interval length. Using the above, a concentrator/router node can generate a randomized the interval between MTORRs. The above duration may be used to implement a "random backoff" period between respective MTORRs.

Figure 9:
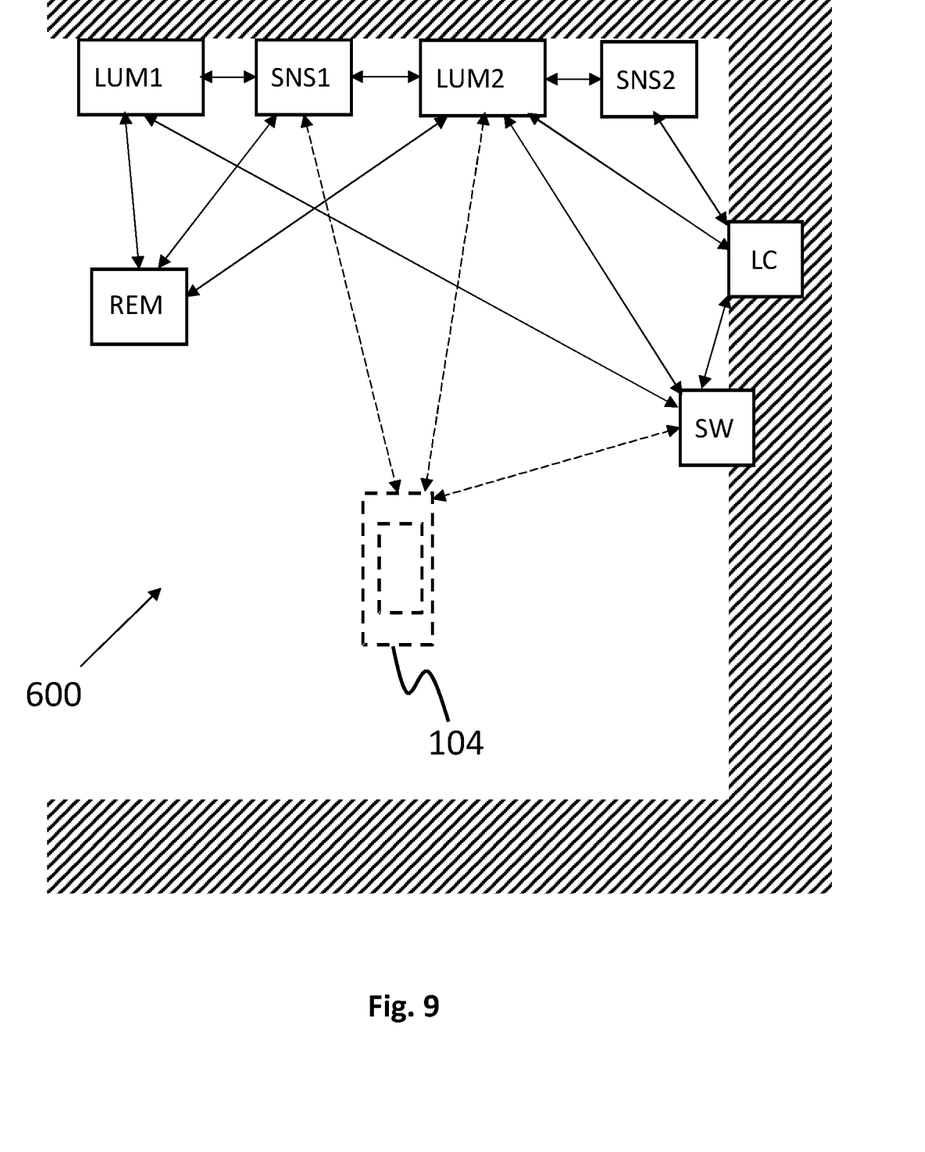
FIG. 9 shows a wireless network comprising lighting network nodes.

As illustrated in FIG. 9, preferably the Zigbee/BLE combo node is a wireless node in a lighting network. FIG. 9 shows a room with a subset of the lighting network nodes of a lighting network 600. The lighting network may for example comprise lighting network nodes in the form of sensors such as presence sensor SNS1 or light sensor SNS2. Also provided in the network is a wireless light switch SW, a luminaire/lighting fixture LUM1 having a wireless function and a light source, as well as a retrofit bulb LUM2 having a wireless function and a light source. In addition two standalone lighting controllers are provided, each with a wireless function, one being the remote control device REM and the second being the lighting controller LC, for example in the form of a hub or a building controller.

Notably the wireless mobile device 104, dashed, is not part of the lighting network, but instead may communicate using the first wireless communication protocol, such as BLE, with one of the combo nodes in the wireless lighting network.

Optionally the network may be a home automation network that is not limited to the lighting application but may include other nodes such as those used for HVAC and/or asset tracking. However, it will be clear to those skilled in the art, that in particular for lighting control it is beneficial to make use of combo nodes as end-user devices such as mobile phones and tablets which may be used for lighting control, often do not support Zigbee but do e.g. support BLE.

The nodes can use the number of (MTORR) routing table entries in their own routing table to determine the network size. They can further use the Device_annces, or the local nwkAddressMap. It may be another configuration parameter, set at commissioning time, or once the network is operational. For example: The Link Status interval is 15 seconds. If the intended MTORR interval is 30 seconds, and there are 200 proxy/router nodes on that network, each of those proxy/router nodes should only send an MTORR every 6000 seconds.

Furthermore, the nodes can track the intervals between each pair of consecutive MTORRs, and adapt their own MTORR interval based on this.

Another method to optimize the number of MTORR would be to analyse the number of MTORR route errors and/or resulting out-of-sequence route requests, MTORR or AODV. This may be an indication of instabilities in some part of the network, e.g. due to changing propagation conditions, etc., and may call for temporary increase of the MTORR frequency.

In yet another extension, the frequency with which a particular node sends its MTORR is individual to that node, and e.g. dependent on its location in the network, number of RFD children it may have, the history of proxy connections, etc.

Next to this a scheduling scheme can be used for MTORR sending that is based on the node's short address: knowing the other nodes in the network via the routing table entries and/or nwkAddressMap, a sorted list of short addresses can be used to determine the node's own position in that list and derive when to send out the next MTORR such that it will not collide with any of the other node's MTORR. This is also helping to equally divide the network overhead of this periodic MTORR mechanism over time.

Furthermore, this method can be used in combination with other routing methods, such as AODV routing and source routing, but not limited to just these two methods.

The FIGS. 2-5 show an example on how the routing tables in the nodes builds up after power up. The lines in these figures symbolize the existence of links between nodes, i.e. node B has a direct link to node A and C, but not to node D. At the start the routing tables $T_A$, $T_B$, $T_C$, $T_D$ of all nodes are empty.

Figure 2:
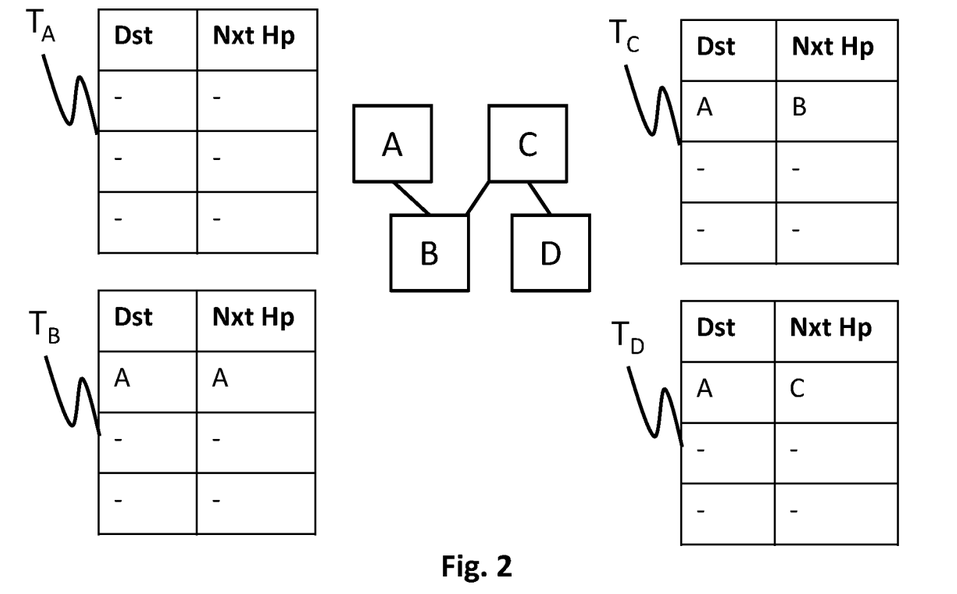
FIGS. 2-5 show an example of how the routing tables in the nodes build up after power up.

FIG. 2 shows the situations after node A sent its MTORR, here the nodes B, C and D receive the MTORR and add the route to node A to their respective routing table ($T_B$, $T_C$, $T_D$).

Figure 3:
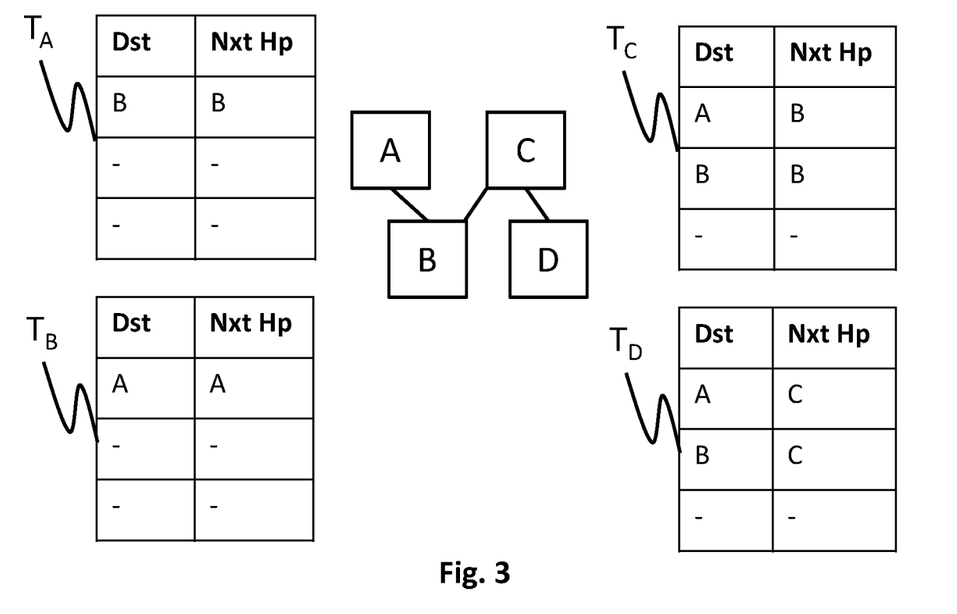

FIG. 3 shows the situation after node B sent its MTORR, here the nodes A, C and D receive the MTORR and add the route to node B to their respective routing table ($T_A$, $T_C$, $T_D$).

Figure 4:
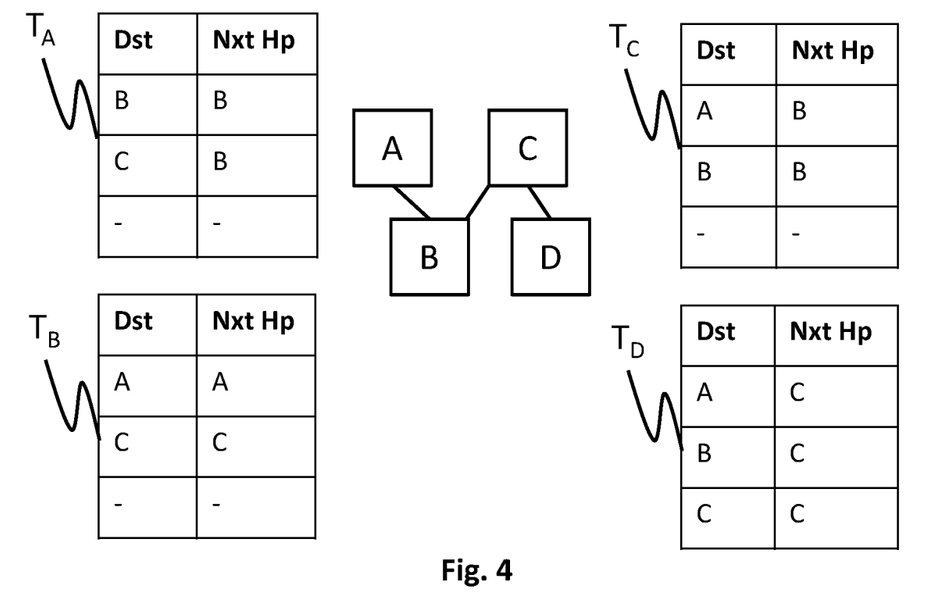

FIG. 4 shows the situation after node C sent its MTORR, here the nodes A, B and D receive the MTORR and add the route to node C to their respective routing table ($T_A$, $T_B$, $T_D$).

Figure 5:
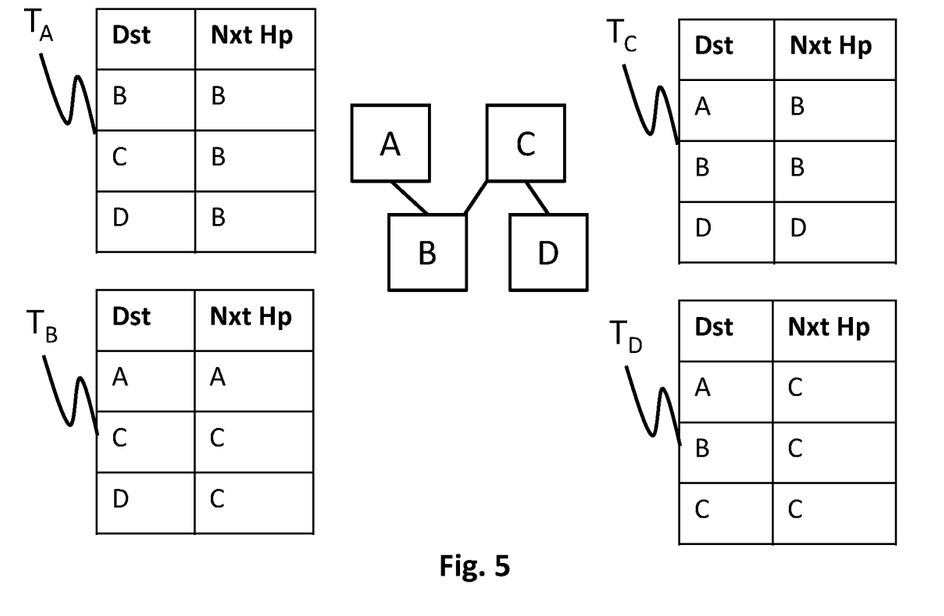

FIG. 5 shows the situation after node D sent its MTORR, here the nodes A, B and C receive the MTORR and add the route to node D to their respective routing table ($T_A$, $T_B$, $T_C$).

Figure 7:
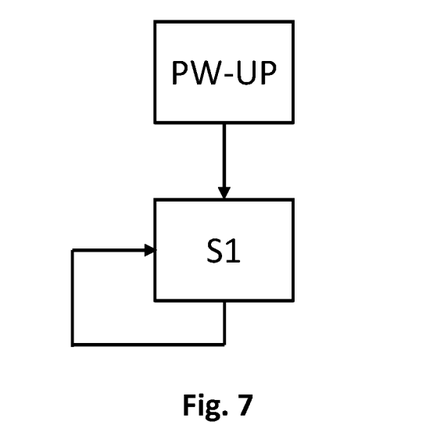
FIG. 7 shows a flow-chart of a method of route discovery in a wireless mesh network.

FIG. 7 shows a flow-chart of a method of route discovery in a wireless mesh network. The wireless mesh network comprises a first plurality of wireless network nodes, each wireless network node of the first plurality arranged to operate as both a proxy and a concentrator. Each wireless network node comprises either a first transceiver to communicate using a first wireless communication protocol, and to communicate using a second wireless communication protocol for wireless mesh networking, or alternatively, a first transceiver to communicate using a first wireless communication protocol, and a second transceiver to communicate using a second wireless communication protocol for wireless mesh networking.

The method comprises each wireless network node of the first plurality in preparation for communicating using the second wireless communication protocol as a concentrator the respective wireless mesh node regularly sending S2 out many-to-one-route-requests in the wireless mesh network at randomized intervals, to prevent a broadcast storm. Wherein preferably the randomized intervals on average exceed 1 minute.

The methods according to the invention may be implemented on a computer as a computer implemented method, or in dedicated hardware, or in a combination of both.

Executable code for a method according to the invention may be stored on computer/machine readable storage means. Examples of computer/machine readable storage means include non-volatile memory devices, optical storage medium/devices, solid-state media, integrated circuits, servers, etc. Preferably, the computer program product comprises non-transitory program code means stored on a computer readable medium for performing a method according to the invention when said program product is executed on a computer or a processing means comprised in a node or a network or a commissioning device as disclosed in the above-described embodiments.

Methods, systems and computer-readable media (transitory and non-transitory) may also be provided to implement selected aspects of the above-described embodiments.

The term "controller" is used herein generally to describe various apparatus relating to, among other functions, the operation of one or more network devices or coordinators. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, compact disks, optical disks, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

The term "network" as used herein refers to any interconnection of two or more devices (including controllers or processors) that facilitates the transport of information (e.g. for device control, data storage, data exchange, etc.) between any two or more devices and/or among multiple devices coupled to the network.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items.

The invention claimed is:

1. A wireless network node (WN1) for use in a wireless mesh network, the wireless network node arranged to operate as a proxy in the wireless mesh network, the wireless network node comprising a first transceiver (XCV1) to communicate using a first wireless communication protocol, and to communicate using a second wireless communication protocol for wireless mesh networking, and wherein the wireless network node is arranged to:
   communicate with a mobile wireless device using the first communication protocol; 1
   communicate with wireless nodes in the wireless network using the second wireless-communication protocol; and
   in response to receipt of a many-to-one-route-request using the wireless mesh network, store an entry into the receiving wireless network node's routing table indicating that the node issuing the many-to-one-route-request is a concentrator node; and wherein the wireless mesh node is arranged to:
   in preparation for communication using the second wireless communication protocol as a concentrator, regularly sends out many-to-one-route-requests in the wireless mesh network at randomized intervals with an average delay above a predetermined value, to spread out the many-to-one-route-request in the wireless mesh network over time.

2. The wireless network node (WN1,WN2) according to claim 1, wherein the first wireless communication protocol is one of Bluetooth Low Energy, BLE; Bluetooth Mesh; Thread; Z-wave, WirelessHart, and IEEE802.11.

3. The wireless network node (WN1,WN2) according to claim 1, wherein the second wireless communication protocol is the Zigbee protocol.

4. The wireless network node (WN1,WN2) according to claim 1, wherein the randomization is by means of a randomized backoff period prior to the transmission of the respective many-to-one-route-request, MTORR.

5. A wireless network node (WN2) for use in a wireless mesh network, the wireless network node arranged to operate as a proxy in the wireless mesh network, the wireless network node comprising:
   a first transceiver (XCV1) to communicate using a first wireless communication protocol, and
   a second transceiver (XCV2) to communicate using a second wireless communication protocol for wireless mesh networking, and wherein the wireless network node is arranged to:
   communicate with a mobile wireless device using the first communication protocol;
   communicate with wireless nodes in the wireless network using the second wireless communication protocol; and in response to a receipt of a many-to-one-route-request using the wireless mesh network, store an entry into the receiving wireless network node's routing table indicating that the node issuing the many-to-one-route-request is a concentrator node; and wherein the wireless network node is arranged to:
in preparation for communication using the second wireless communication protocol as a concentrator, regularly sends out many-to-one-route-requests, MTORRs, in the wireless mesh network at randomized intervals with an average delay above a predetermined value, to spread out the many-to-one-route-requests in the wireless mesh network over time.

6. The wireless network node (WN1,WN2) according to as claim 5, wherein the wireless network node is a lighting network node, being at least one of: a presence sensor (SNS1), a light sensor (SNS2), a lighting switch (SW), a retrofit lamp (LUM2), a luminaire (LUM1), and a wireless lighting controller (LC).

7. A method of route discovery in a wireless mesh network comprising a first plurality of wireless network nodes, each wireless network node of the first plurality arranged to operate as a proxy in the wireless mesh network and comprising a first transceiver to communicate using a first wireless communication protocol, and to communicate using a second wireless communication protocol for wireless mesh networking, in response to receipt of a many-to-one-route-request using the wireless mesh network, storing an entry into the receiving wireless network node's routing table indicating that the node issuing the many-to-one-route-request is a concentrator node;
the method comprising each wireless network node of the first plurality operating as both a proxy and a concentrator and:
in preparation for communicating using the second wireless communication protocol as a concentrator the respective wireless mesh node regularly sending (S1) out many-to-one-route-requests in the wireless mesh network at randomized intervals with an average delay above a predetermined value, to spread out the many-to-one-route-requests in the wireless mesh network over time.

8. A wireless mesh network comprising a first plurality of wireless network nodes,
each wireless network node of the first plurality arranged to operate as a proxy comprising a first transceiver to communicate using a first wireless communication protocol, and to communicate using a second wireless communication protocol for wireless mesh networking, wherein each of the first plurality of wireless network nodes is arranged to:
communicate with a mobile wireless device using the first communication protocol;
communicate with wireless nodes in the wireless network using the second wireless communication protocol; and
in response to receipt of a many-to-one-route-request using the wireless mesh network, store an entry into the receiving wireless network node's routing table indicating that the node issuing the many-to-one-route-request is a concentrator node;
wherein each wireless network node of the first plurality is arranged to operate as both a proxy and a concentrator and;
in preparation for communication using the second wireless communication protocol as a concentrator, regularly send out many-to-one-route-requests in the wireless mesh network at randomized intervals with an average delay above a predetermined value, to spread out the many-to-one-route-requests in the wireless mesh network over time.

9. The wireless mesh network according to claim 8, wherein the predetermined value is based on the size of the network or number of proxies in the network and randomized.

10. The wireless mesh network according to claim 8, wherein the wireless mesh network consists of the first plurality of wireless network nodes and a second plurality of wireless network nodes, and each wireless network node of the second plurality comprises a second transceiver to:
communicate using the second wireless communication protocol, and wherein each of the second plurality of network nodes is arranged to:
communicate with nodes in the wireless mesh network using the second wireless communication protocol and wherein the number of wireless router nodes in the first plurality is larger than 30% of the total number of wireless router nodes in the wireless mesh network.

11. The wireless mesh network according to claim 10, wherein some or all nodes of the wireless network nodes of the second plurality are configurable and structurally have the same communication capabilities as those of the first plurality, but where the some or all nodes of the wireless network nodes of the second plurality have been configured to disable communication using the first wireless communication protocol.

12. The wireless mesh network according to claim 8, wherein the randomized intervals are above 15 minutes.

13. The wireless mesh network (100) according to claim 8, wherein the wireless network nodes of the first plurality are arranged to:
operate as a proxy node for a mobile device that wants to communicate with a further wireless network node in the wireless mesh network,
connect to the mobile device using the first communication protocol, and
relay information from at least one of:
the mobile device to the further wireless network node using the second communication protocol and
the further wireless network node to the mobile device using the first communication protocol.

14. The wireless mesh network according to claim 8, wherein the wireless mesh network node is a network without a fixed gateway.

15. A wireless mesh network comprising a first plurality of wireless network nodes,
each wireless network node of the first plurality arranged to operate as a proxy comprising:
a first transceiver to communicate using a first wireless communication protocol, and
a second transceiver to communicate using a second wireless communication protocol for wireless mesh networking, wherein each of the first plurality of wireless network nodes is arranged to:
communicate with a mobile wireless device using the first communication protocol;
communicate with wireless nodes in the wireless network using the second wireless communication protocol and
in response to receipt of a many-to-one-route-request using the wireless mesh network, store an entry into the receiving wireless network node's routing table indicating that the node issuing the many-to-one-route-request is a concentrator node;

wherein each wireless network node of the first plurality is arranged to operate as both a proxy and a concentrator and;

in preparation for communication using the second wireless communication protocol as a concentrator, regularly send out many-to-one-route-requests over the wireless mesh network at randomized intervals with an average delay above a predetermined value, to spread out the many-to-one-route-requests in the wireless mesh network over time.

* * * * *